March 4, 1958  H. E. WILLIAMS  2,825,413
FOAM GENERATING APPARATUS
Filed Sept. 19, 1955  2 Sheets-Sheet 1

Inventor
H. E. Williams
By Hascott Downing & Seebey
Attys.

March 4, 1958

H. E. WILLIAMS 2,825,413

FOAM GENERATING APPARATUS

Filed Sept. 19, 1955

2 Sheets-Sheet 2

Inventor
H. E. Williams
By Glascock Downing Leibold
Attys.

United States Patent Office 2,825,413
Patented Mar. 4, 1958

2,825,413

FOAM GENERATING APPARATUS

Harold Ernest Williams, London, England, assignor to A. F. P. Engineering Limited, London, England Application September 19, 1955, Serial No. 535,217

Claims priority, application Great Britain September 23, 1954

9 Claims. (Cl. 169—15)

This invention relates to foam generating apparatus for fire fighting.

The invention consists in foam generating apparatus comprising two hollow frusto-conical members coaxially disposed one within the other in such a way as to provide an annular passage of increasing width between the walls of the members and wherein a helical guideway is provided within said annular passage whereby liquid and foam stabilizer may be expanded into said annular passage and deflected into the interior of the inner frusto-conical member at a substantially constant velocity.

According to the preferred arrangement, the outer frusto-conical member is provided with a plurality of holes or perforations and is disposed within a chamber adapted to be supplied with air under pressure whereby water and foam stabilizer may be mixed with air while passing through the aforesaid annular passage, one end of the chamber being provided with an arcuate shaped deflecting member so arranged as to direct the foam into an outlet formed by the inner frusto-conical member.

Preferably means are provided for varying or adjusting the supply of water and foam stabilizer to the annular passage and an open mesh screen is provided at one end of the outer frusto-conical member between said annular passage and said deflecting means whereby the liquid and foam passing through said passage is reversed in direction and caused to pass through said screen twice before reaching said foam outlet.

Figure 1:
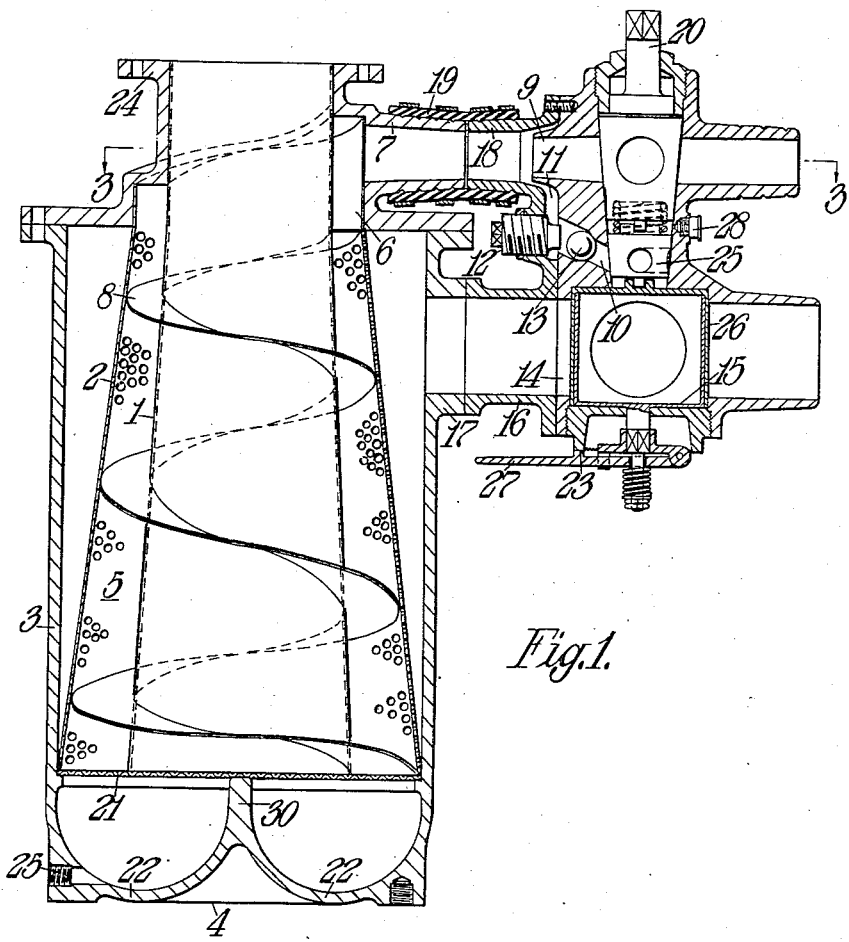
Figure 3:
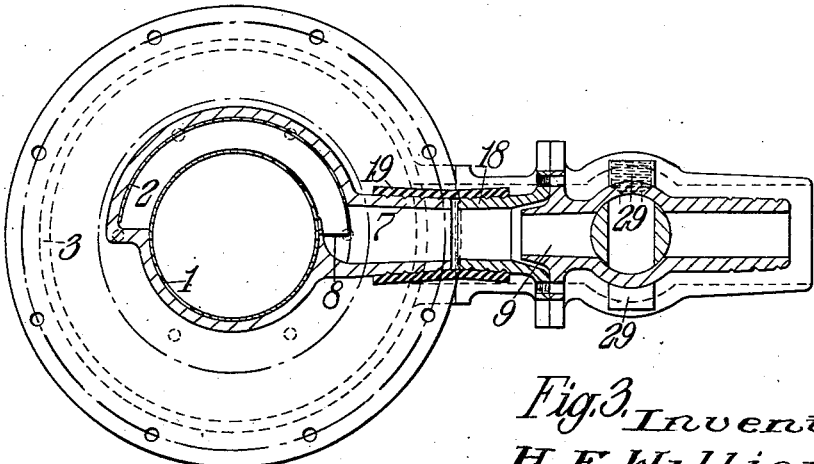
Figure 2:
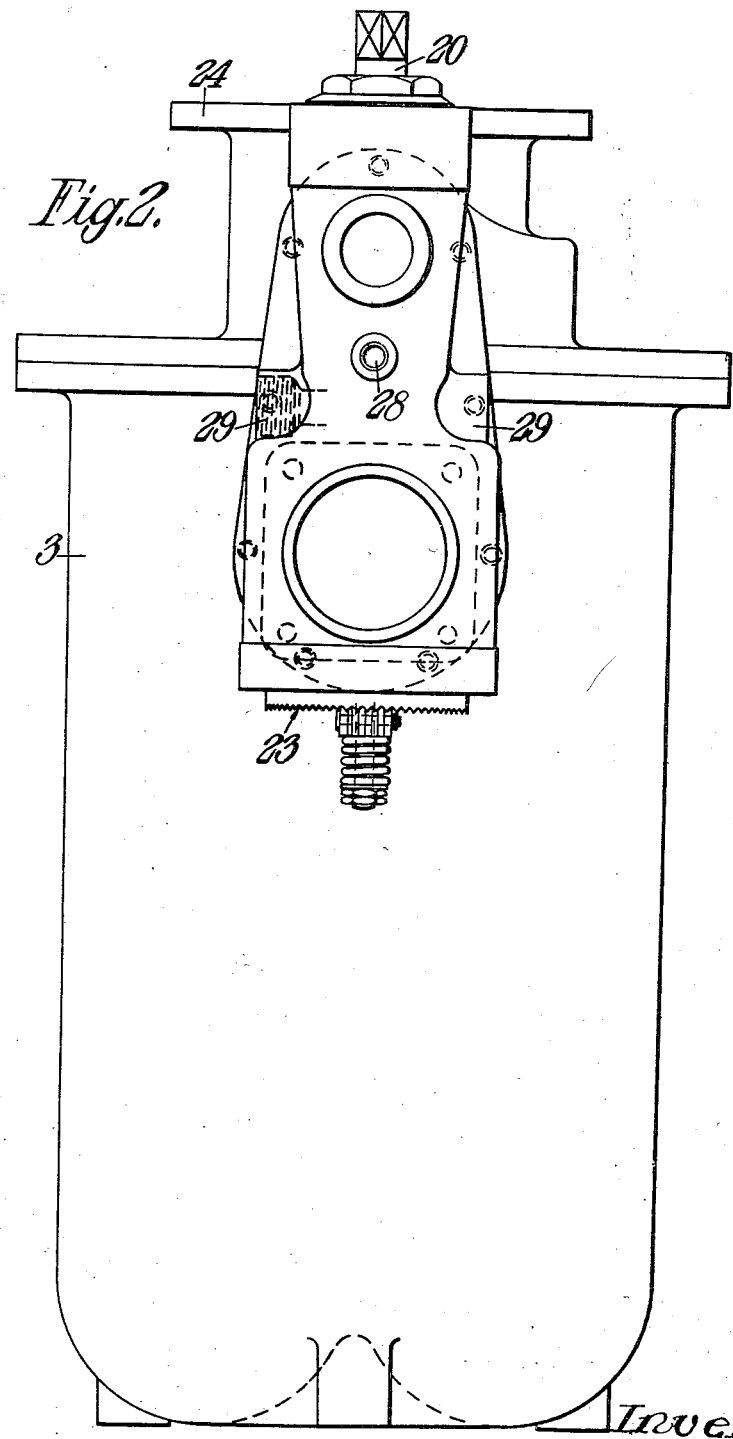

The invention will be more completely understood from the following detailed description which is given in conjunction with the accompanying drawings in which Figures 1, 2 and 3 are sectional side, end and plan views respectively of a foam generating apparatus constructed in accordance with the invention.

Referring now to these drawings, I construct our improved foam generating apparatus in the form of two truncated hollow conical members 1, 2 which are co-axially arranged one within the other and assembled within a hollow cylindrical body 3 which is conveniently closed at the bottom by a removable cover 4. The two truncated conical members 1, 2 are spaced apart from one another, and are so constructed that the angle between their common axis and the wall of the inner cone 1, is smaller than the angle between such axis and the wall of the outer cone 2, so that an annular passage 5 is formed between the two members, having a cross section increasing in width from one end of the passage to the other. Through the top of the cylindrical body 3 the outer truncated cone 2 projects to a suitable height but its wall is cut helically so as to terminate in a chamber 6 disposed above the aforesaid cylindrical body 3, and provided with an inlet tube 7 for the supply of water and foam stabilizer or foam producing material. This chamber has a removable bolted cover.

Between the two truncated cones 1 and 2 a helical track or guideway 8 is fitted which leads from the feed chamber 6 and has a gradually increasing pitch and increasing width. Water, foam stabilizer, and air are supplied under pressure through the control valve shown on the right Figure 1. This valve has three passages, the upper one 9 of which controls the flow of water to the air foamer, and the central one 10 of which controls the flow of foam stabilizer which flows from a supply tank by gravity and is induced into the water stream through the passage 11, the rate of flow being adjustable by the screw 12 and ball 13. The lowermost passage 14 which is adjustable by the member 15 is for the admission of air from a suitable blower, and terminates in an outlet pipe 16 which is connected by any suitable means to an inlet 17 in the wall of the cylindrical body 3, while the upper passage 9 terminates in an outlet pipe 18 which is connected by a union member 19 to the inlet 7 leading to the chamber 6. Each of the three passages in the control valve passes through a plug cock or throttle. The upper plug 20 for pressure water has a squared end on its shank to receive the operating handle. At the lower end of the plug a transverse rectangular section bar is formed which is arranged to fit into a slot provided in the top of the plug of the middle cock 25 (for foam stabilizer) so that the rotation of the upper plug causes the middle plug to move with it. A light spring is arranged between the upper and middle plug to maintain the middle plug in proper contact with the body and keep it "fluid" tight.

Similarly on the lower end of the middle plug a transverse rectangular section bar is provided which engages a slot on the upper side of a cylindrical throttle 26 (for air under pressure) so that this throttle also moves in unison with the two plugs above it. The positioning of the porting in the two plugs 20 and 25 and the throttle 26 is such that they blank off the passageways simultaneously. The passageway in the upper cock and the throttle are of the straightway type. That of the middle plug has an entry at the side at 90° to the discharge so that it is possible for the feed to be taken from either side of the body as may be desired. Within the cylindrical throttle 26 which is machined inside and out, a second cylindrical throttle is provided. This can only be operated by the movement of a special handle 27 mounted on the lower end of the assembly. This handle re- strained from movement by a ratchet device 23 so that it can be moved and locked in any desired position. The function of the inner throttle 15 is to provide means of partially restricting air flow to suit the 'expansions' of the foam to be produced in the generator. Similarly the adjusting screw 12 can be set to limit the movement of the non-return ball valve 13 from its seat and thereby set the quantity of flow of foam stabilizer to the desired percentage of the water flow. The cock 20 is intended to be opened fully with a 90° rotation from the closed position. This movement will be followed by the plug 25 and the cylindrical throttle 26 and their ports will also be fully opened. The adjustments of screwed plug 12 and inner throttle 15 being used to set the quantities of foam stabilizer and air respectively so as to produce foam of the required quality.

The ball valve setting device and non-return valve are so arranged as to prevent water under pressure from flowing back into the foam stabilizer tank should the discharge from the generator become obstructed when the cock 20 is opened.

The device is provided with a lubricator 28 and alternative side entry connections for foam stabilizer 29.

With this arrangement, water and foam stabilizer is fed through the inlet 7 tangentially against the inner face of the outer truncated cone 2 in the helical passageway and due to its velocity, centrifugal action maintains the liquid against the wall of the outer cone as it proceeds downward. Air under suitable pressure is fed through the inlet 17 into the outer cylindrical body 3, and passes into the passageway 5 between the truncated cones 1 and 2, through a plurality of holes or perforations formed in the wall of the outer truncated cone 2 so that this will puncture the water and foam stabilizer solution and intimately mix with the liquid to form globules. Any foam formed will, due to its lesser density, be displaced towards the outer wall of the inner truncated cone 1 and the liquid remaining will, due to its greater density, continue to pass along the inside of the outer truncated cone 2. The lower end of the assembly is covered with a wire mesh screen 21 which is held in place by a hemispherical or other arcuate shaped base plate 22, having a central pillar 30 so that as the emulsion and foam issue from the base of the annular passageway it is constrained to pass through the wire mesh screen 21 and due to the shape of the base is reversed rapidly in direction causing sufficient turbulence to effect an intimate forming of the foam, which passes back through the wire mesh screen 21 into the interior of the inner truncated cone 1 and rises to the discharge outlet 24 to which suitable connections may be made.

Thus by means of this arrangement, the expanding volume of the formed foam may be accommodated as it proceeds down the annular passage between the two truncated cones, and an output of constant velocity may thus be maintained.

Moreover, by regulating the air and water supplied both the quantity and the expansion of the foam generated can be varied up to the limit of the output for which the generator is designed.

The area of the annulus between the truncated cones 1 and 2 at the base of the latter is substantially equal to the area of the base of the inner truncated cone 1.

The apparatus is conveniently constructed of mild steel sheet or other suitable metal suitably protected against corrosion and a drainage plug 25 is preferably provided at the base for drainage.

The apparatus may be built in any desired size to produce any required output of foam, or alternatively a plurality of units may be grouped and used either independently or together as may be required to give varying outputs of foam.

The apparatus may be used at any convenient pressure which may vary within wide limits but which would probably lie somewhere between 3 lbs. per sq. inch and 35 lbs. per sq. inch.

I claim:

1. Foam generating apparatus for fire fighting comprising two hollow frusto-conical members coaxially disposed one within the other in such a way as to provide an annular space between the walls of the members, said space increasing in width from one end to the other of said members, means for introducing a mixture of liquid and foam stabilizer tangentially into said annular space at the narrow end thereof so as to direct and maintain the mixture against the wall of said outer member, guide means for controlling the movement of said mixture through said space, and means for introducing air under pressure into said mixture during its movement through said space so as to form globules of foam.

2. Foam generating apparatus for fire fighting comprising two hollow frusto-conical members coaxially disposed one within the other in such a way as to provide an annular space between the walls of said members, said space increasing in width from one end to the other of said members, means for introducing a mixture of liquid and foam stabilizer tangentially into said annular space near to the narrow end thereof so as to maintain by centrifugal force a film of mixture on the wall of said outer member, a helical guideway disposed between said members for controlling the movement of said mixture and directing its passage through said space and means for introducing air under pressure into said film of mixture during its passage through said space so as to form globules of foam.

3. Foam generating apparatus for fire fighting comprising a hollow chamber, two hollow frusto-conical members disposed one within the other within said chamber so as to provide an annular space between said members, said space increasing in width from one end to the other of said members, the outer one of which has a perforated wall, means for introducing a mixture of liquid and foam stabilizer tangentially into said annular space near to the narrow end thereof so as to maintain by centrifugal force a film of mixture on the wall of said outer member, a helical guideway disposed between said members for controlling the movement of said mixture and directing its passage through said space, and means for introducing air under pressure through the perforated wall of said outer member into said film of mixture during its passage through said space so as to form globules of foam.

4. Foam generating apparatus for fire fighting comprising two hollow frusto-conical members coaxially disposed one within the other in such a way as to provide an annular space between the walls of the members, said space increasing in width from one end to the other of said members, means for introducing a mixture of liquid and foam stabilizer tangentially into said annular space at the narrow end thereof so as to direct and maintain the mixture against the wall of said outer member, guide means for controlling the movement of said mixture through said space, means for introducing air under pressure into said mixture during its movement through said space so as to form globules of foam, and means for deflecting the foam so formed into the interior of said inner member.

5. Foam generating apparatus for fire fighting comprising two hollow frusto-conical members coaxially disposed one within the other in such a way as to provide an annular space between the walls of the members, said space increasing in width from one end to the other of said members, means for introducing a mixture of liquid and foam stabilizer tangentially into said annular space at the narrow end thereof so as to direct and maintain the mixture against the wall of said outer member, guide means for controlling the movement of said mixture through said space, means for introducing air under pressure into said mixture during its movement through said space so as to form globules of foam, means for deflecting the foam so formed into the interior of said inner member, and an open mesh screen disposed between said annular space and said deflecting means whereby the liquid and foam passing through said annular space is forced through said screen before reaching the interior of said inner member.

6. Foam generating apparatus for fire fighting comprising a hollow chamber, two hollow frusto-conical members disposed one within the other within said chamber so as to provide an annular space between the walls of said members, said space increasing in width from one end to the other of said members the outer one of which has a perforated wall, means for introducing a mixture of liquid and foam stabilizer tangentially into said annular space near to the narrow end thereof so as to maintain by centrifugal force a film of mixture on the wall of said outer member, a helical guideway disposed between said members for controlling the movement of said mixture and directing its passage through said space, and means for introducing air under pressure through the perforated wall of said outer member into said film of mixture during its passage through said space so as to form globules of foam, arcuate shaped deflector means for directing the foam so formed into the interior of said inner member and an open mesh screen disposed between said annular space and said deflecting means whereby the liquid and foam passing through said annular space is forced through said screen before reaching the interior of said inner member.

7. Foam generating apparatus for fire fighting as claimed in claim 6, wherein said arcuate shaped deflecting member is of hemispherical form and said open mesh screen is arranged to cover the outlet from said annular space and the inlet to the interior of said inner member whereby the liquid and foam is reversed in direction and is caused to pass through said screen twice before entering the interior of said inner frusto-conical member whereby sufficient turbulence is produced to effect an intimate forming of foam.

8. Foam generating apparatus for fire fighting as claimed in claim 1 and comprising valve means for adjusting the supply of liquid and foam stabilizer to said annular passage, said valve means having three passages for controlling respectively the flow of liquid, foam stabilizer and air, adjustment means being provided whereby the quantities of air and foam stabilizer may be varied independently with respect to the flow of liquid so as to vary the quantity of foam produced.

9. Foam generating apparatus for fire fighting as claimed in claim 1 and comprising valve means for adjusting the supply of liquid and foam stabilizer to said annular passage, said valve means having three passages for controlling respectively the flow of liquid, foam stabilizer and air, adjustment means being provided whereby the quantities of air and foam stabilizer may be varied independently with respect to the flow of liquid so as to vary the quality of foam produced.

References Cited in the file of this patent

UNITED STATES PATENTS

| | | |
|---|---|---|
| 214,090 | Bott | Apr. 8, 1879 |
| 515,528 | McGahan | Feb. 27, 1894 |
| 1,017,585 | Pattin | Feb. 13, 1912 |
| 1,874,209 | Schnabel | Aug. 30, 1932 |
| 2,003,184 | Friedrich | May 28, 1935 |
| 2,138,133 | Betzler | Nov. 29, 1938 |

FOREIGN PATENTS

| | | |
|---|---|---|
| 450,460 | Italy | July 21, 1949 |
| 491,838 | Great Britain | Sept. 9, 1938 |
| 917,765 | Germany | Sept. 9, 1954 |